United States Patent
Olson et al.

(10) Patent No.: US 11,861,322 B2
(45) Date of Patent: Jan. 2, 2024

(54) AUTOMATED MANAGEMENT OF REVISED IVR PROMPT TRANSLATIONS

(71) Applicant: Intrado Corporation, Omaha, NE (US)

(72) Inventors: Terry Olson, Bennington, NE (US); Mark L. Sempek, Blair, NE (US); Roger Wehrle, Omaha, NE (US)

(73) Assignee: WEST TECHNOLOGY GROUP, LLC, Omaha, NE (US)

( * ) Notice: Subject to any disclaimer, the term of this patent is extended or adjusted under 35 U.S.C. 154(b) by 165 days.

(21) Appl. No.: 17/320,176

(22) Filed: May 13, 2021

(65) Prior Publication Data

US 2022/0366149 A1    Nov. 17, 2022

(51) Int. Cl.
*G06F 40/51* (2020.01)
*G06F 40/18* (2020.01)
*G06F 40/58* (2020.01)
*G06F 40/174* (2020.01)

(52) U.S. Cl.
CPC ............ *G06F 40/51* (2020.01); *G06F 40/174* (2020.01); *G06F 40/18* (2020.01); *G06F 40/58* (2020.01)

(58) Field of Classification Search
CPC ........ G06F 40/51; G06F 40/174; G06F 40/18; G06F 40/58
See application file for complete search history.

(56) References Cited

U.S. PATENT DOCUMENTS

| | | | |
|---|---|---|---|
| 7,548,928 B1* | 6/2009 | Dean | G06F 16/90344 |
| 7,567,973 B1* | 7/2009 | Burrows | G06F 16/22 |
| 11,365,980 B1* | 6/2022 | Akhtar | G01C 21/3804 |
| 2007/0033354 A1* | 2/2007 | Burrows | G06F 16/125 711/156 |
| 2015/0057994 A1* | 2/2015 | Fang | G06F 40/253 704/4 |
| 2015/0120739 A1* | 4/2015 | Hosokawa | G06F 16/285 707/740 |
| 2016/0212185 A1 | 7/2016 | Krishnan et al. | |
| 2016/0253434 A1 | 9/2016 | Yu | |
| 2016/0350284 A1* | 12/2016 | Yan | G06F 40/51 |
| 2020/0175973 A1 | 6/2020 | Bender et al. | |
| 2022/0092274 A1* | 3/2022 | Arivazhagan | G06F 40/47 |
| 2022/0327309 A1 | 10/2022 | Carlock et al. | |

* cited by examiner

*Primary Examiner* — Daniel C Washburn
*Assistant Examiner* — Athar N Pasha

(57) ABSTRACT

An example operation may include one or more of transferring a copy of a plurality of revised translation data sets to be added to a software application into a grid structure, each revised translation data set comprising a prompt name in a first field, an interactive voice response (IVR) prompt in a second field, a translation of the IVR prompt into a different language in a third field, and a timestamp in a fourth field, identifying two revised translation data sets in the grid structure that comprise a duplicate prompt names in first fields thereof, deleting an oldest revised translation data set among the two identified translations data sets from the grid structure which has an oldest timestamp, and storing the grid structure without the deleted oldest revised translation data set in a repository.

18 Claims, 13 Drawing Sheets

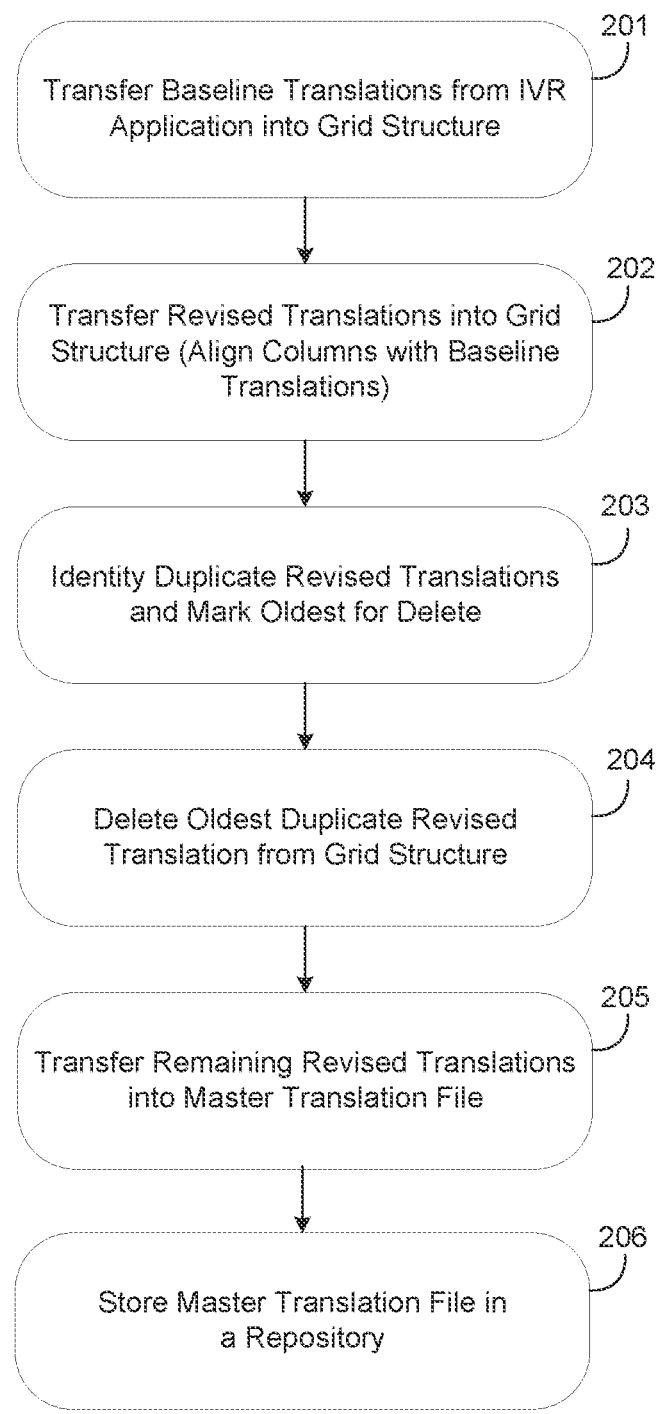

| Prompt Name | English Text | Translation Text | Date | Order |
|---|---|---|---|---|
| AddServiceMenu_1 | Which would you like to add... | Cual le gustaria agregar... | 1/24/21 | 1 |
| AddServiceMenu_2 | To hear that again say repeat | Para escuchar de neuvo, diga... | 1/24/21 | 3 |
| AddServiceMenu_3 | cable TV | TV por cable | 1/24/21 | 7 |
| AddServiceMenu_4 | high-speed internet | Internet de alta velocidad | 1/24/21 | 14 |
| AddServiceMenu_5 | phone service | telefono | 1/24/21 | 19 |

...

220B

| AddServiceMenu_2 | To hear that repeated say... | Para tener eso repetido... | 2/07/21 | 33 |
| AddServiceMenu_3 | cable television | Television por cable | 2/07/21 | 35 |

...

220C

| AddServiceMenu_1 | Which service would you like... | Que servicio le gustaria agregar | 2/13/21 | 62 |
| AddServiceMenu_3 | television | television | 2/13/21 | 74 |

| Prompt Name | English Text | Translation Text | Date | Order |
|---|---|---|---|---|
| AddServiceMenu_1 | Which would you like to add... | Cual le gustaria agregar... | 1/24/21 | 1 |
| AddServiceMenu_2 | To hear that again say repeat | Para escuchar de neuvo, diga... | 1/24/21 | 3 |
| AddServiceMenu_3 | cable TV | TV por cable | 1/24/21 | 7 |
| AddServiceMenu_4 | high-speed internet | Internet de alta velocidad | 1/24/21 | 14 |
| AddServiceMenu_5 | phone service | telefono | 1/24/21 | 19 |
| ... | | | | |
| AddServiceMenu_2 | To hear that repeated say... | Para tener eso repetido ... | 2/07/21 | 33 |
| AddServiceMenu_3 | cable television | Television por cable | 2/07/21 | 35 |
| ... | | | | |
| AddServiceMenu_1 | Which service would you like ... | Que servicio le gustaria agregar | 2/13/21 | 62 |
| AddServiceMenu_3 | television | television | 2/13/21 | 74 |
| ... | | | | |

| | Prompt Name | English Text | Translation Text | Date | Order | Delete |
|---|---|---|---|---|---|---|
| 221A | AddServiceMenu_1 | Which would you like to add... | Cual le gustaria agregar... | 1/24/21 | 1 | Yes |
| | AddServiceMenu_1 | Which service would you like... | Que servicio le gustaria agregar | 2/13/21 | 30 | |
| 222A | AddServiceMenu_2 | To hear that again say repeat | Para escuchar de neuvo, diga... | 1/24/21 | 3 | Yes |
| | AddServiceMenu_2 | To hear that repeated say . . . | Para tener eso repetido . . . | 2/07/21 | 33 | |
| 223A | AddServiceMenu_3 | cable TV | TV por cable | 1/24/21 | 7 | Yes |
| 223B | AddServiceMenu_3 | cable television | Television por cable | 2/07/21 | 35 | Yes |
| | AddServiceMenu_3 | television | television | 2/13/21 | 74 | |
| | AddServiceMenu_4 | high-speed internet | Internet de alta velocidad | 1/24/21 | 14 | |
| | AddServiceMenu_5 | phone service | telefono | 1/24/21 | 19 | |

Master Translation File 130

| Prompt Name | English Text | Translation Text | Date | Order |
|---|---|---|---|---|
| AddServiceMenu_1 | Which service would you like... | Que servicio le gustaria agregar | 2/13/21 | 62 |
| AddServiceMenu_2 | To hear that repeated say . . . | Para tener eso repetido . . . | 2/07/21 | 33 |
| AddServiceMenu_3 | television | television | 2/13/21 | 74 |
| AddServiceMenu_4 | high-speed internet | Internet de alta velocidad | 1/24/21 | 14 |
| AddServiceMenu_5 | phone service | telefono | 1/24/21 | 19 |

200E

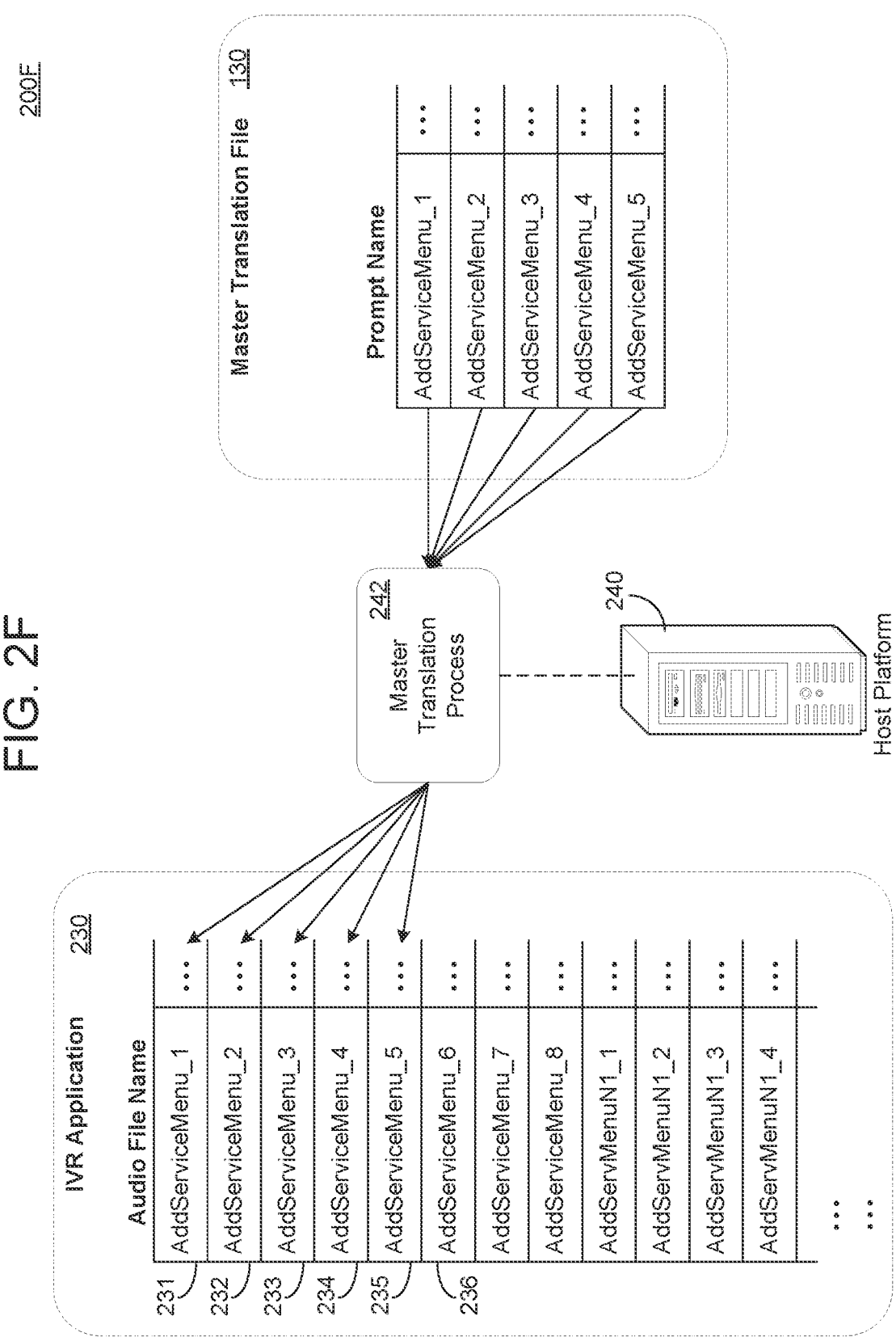

FIG. 3C

| Prompt Name | English Text | Translation Text | Date | Order | Check |
|---|---|---|---|---|---|
| AddServiceMenu_7 | Would you like to hear about the sports package? | Le gustaría conocer el paquete deportivo? | 4/09/21 | 7 | |
| AddServiceMenu7N_1 | Would you like to hear about the sports package? | Te gustaría conocer el paquete deportivo? | 4/13/21 | 12 | Yes |
| AddServiceMenu_8 | Which channels? | que canales? | 4/09/21 | 8 | |
| AddServiceMenu_9 | To hear those again press pound. | para escuchar esos de nuevo presione libra. | 4/09/21 | 9 | |
| AddServiceMenu_10 | If you need something else, press one for main menu. | Si necesita algo más, presione uno para el menú principal. | 4/09/21 | 10 | |
| AddServiceMenu_11 | If you are finished, hang up when ready. | Si necesita algo más, presione uno para el menú principal o cuelgue cuando esté listo. | 4/09/21 | 11 | Yes |

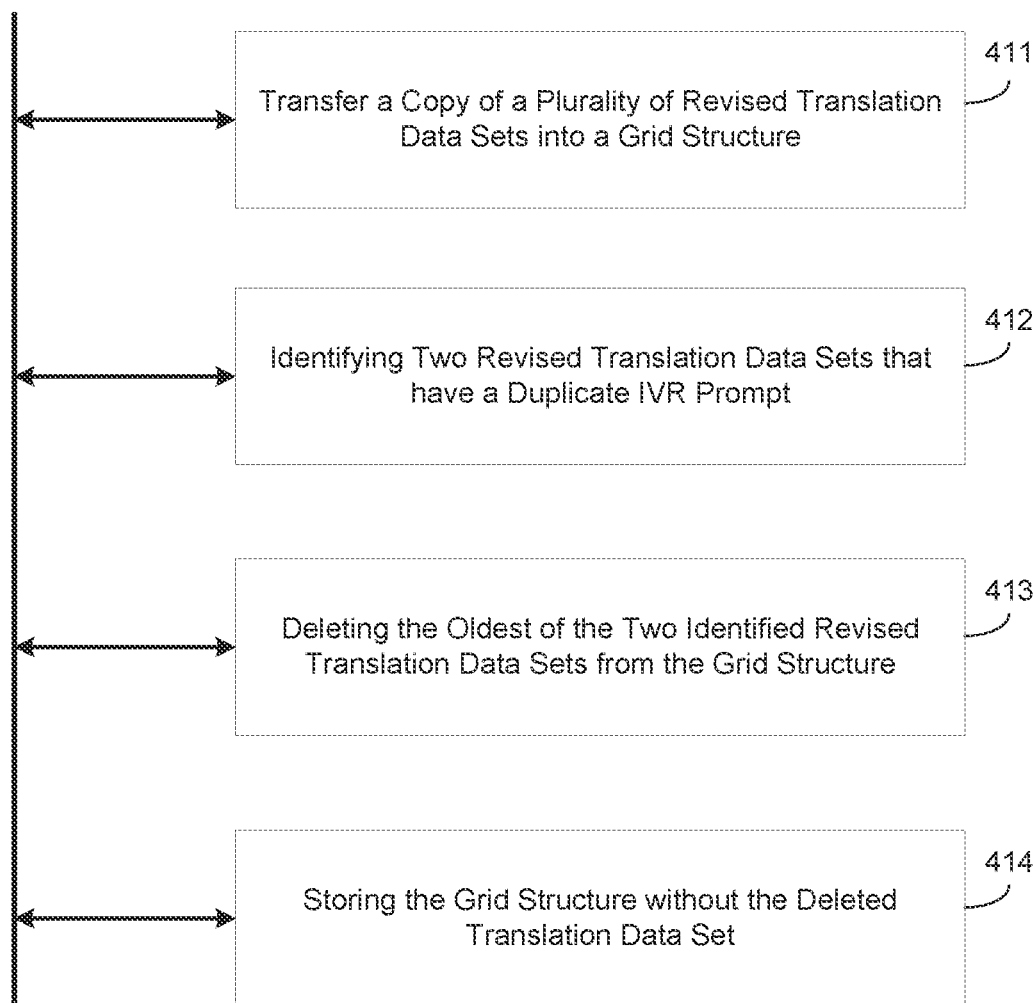

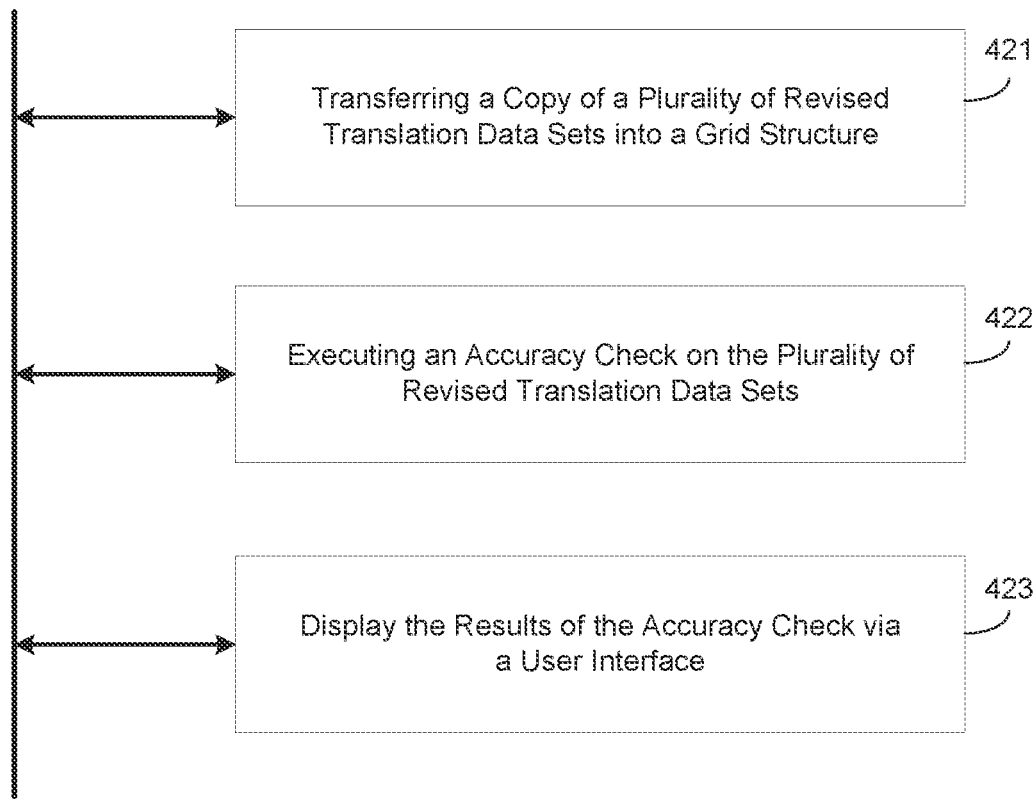

AUTOMATED MANAGEMENT OF REVISED IVR PROMPT TRANSLATIONS

CROSS-REFERENCE TO RELATED APPLICATION

This application is related to co-pending U.S. non-provisional patent application Ser. No. 17/320,189, filed on May 13, 2021, entitled, "VALIDATION OF REVISED IVR PROMPT TRANSLATION," which is incorporated herein by reference in its entirety.

BACKGROUND

Interactive Voice Response (IVR) is a telephony technology allows a human to interact with a computer through the use of voice and touch tone inputs. In some cases, an IVR application may output pre-recorded audio as well as dynamically generated audio that is based on words, or database information collected from a user on the call. For example, an IVR prompt may request a user to repeat or verify a previously spoken input by repeating the same input. IVR uses prompts (e.g., voice prompts) to provide users with information such as instructions and directions for accessing data. For example, an IVR application may include a sequence of prompts which each include sentences, phrases, and individual words that provide greetings and informational messages.

In many cases, the IVR prompts are created in a first language (e.g., English, etc.) and then translations are provided in other languages (e.g., Spanish, German, French, etc.) The translation process can require a number of rounds of revisions in which translator makes changes or otherwise modifies the text content of the translated version of the IVR prompt. Here, the newly translated text may be inserted into a form or other document. Each time the translation is revised, the accuracy of such a revision must be verified by a person. This requires the user to perform a crude stare and compare process which consumes a significant amount of time especially when multiple rounds of revisions are implemented. Accordingly, what is needed is a more efficient mechanism for updating revised translations and verifying the accuracy of the revised translations.

SUMMARY

One example embodiment may provide an apparatus that includes a memory, and a processor communicably coupled to the memory and configured to one or more of transfer a copy of a plurality of revised translation data sets to be added to the software application into a grid structure, where each revised translation data set comprises an interactive voice response (IVR) prompt in a first field, a translation of the IVR prompt into a different language in a second field, and a timestamp in a third field, identify two revised translation data sets in the grid structure that comprise a duplicate IVR prompt in first fields thereof, delete an oldest revised translation data set among the two identified translations data sets from the grid structure which has an oldest timestamp, and store the grid structure without the deleted oldest revised translation data set in a repository.

Another example embodiment may provide a method that includes one or more of transferring a copy of a plurality of revised translation data sets to be added to the software application into a grid structure, each revised translation data set comprising an interactive voice response (IVR) prompt in a first field, a translation of the IVR prompt into a different language in a second field, and a timestamp in a third field, identifying two revised translation data sets in the grid structure that comprise a duplicate IVR prompt in first fields thereof, deleting an oldest revised translation data set among the two identified translations data sets from the grid structure which has an oldest timestamp, and storing the grid structure without the deleted oldest revised translation data set in a repository.

A further example embodiment may provide a non-transitory computer readable medium comprising instructions, that when read by a processor, cause the processor to perform one or more of transferring a copy of a plurality of revised translation data sets to be added to the software application into a grid structure, each revised translation data set comprising an interactive voice response (IVR) prompt in a first field, a translation of the IVR prompt into a different language in a second field, and a timestamp in a third field, identifying two revised translation data sets in the grid structure that comprise a duplicate IVR prompt in first fields thereof, deleting an oldest revised translation data set among the two identified translations data sets from the grid structure which has an oldest timestamp, and storing the grid structure without the deleted oldest revised translation data set in a repository.

BRIEF DESCRIPTION OF THE DRAWINGS

FIGS. 2A-2F are diagrams illustrating a process of deleting duplicate revised IVR prompt translation data sets according to example embodiments.

FIGS. 3A-3C are diagrams illustrating a process of validating an accuracy of IVR prompt translation data sets according to example embodiments.

FIG. 4A is a diagram illustrating a method of deleting duplicate revised translation data sets of IVR prompts according to example embodiments.

FIG. 4B is a diagram illustrating a method of validating an accuracy of IVR prompt translation data sets according to example embodiments.

DETAILED DESCRIPTION

Figure 1:
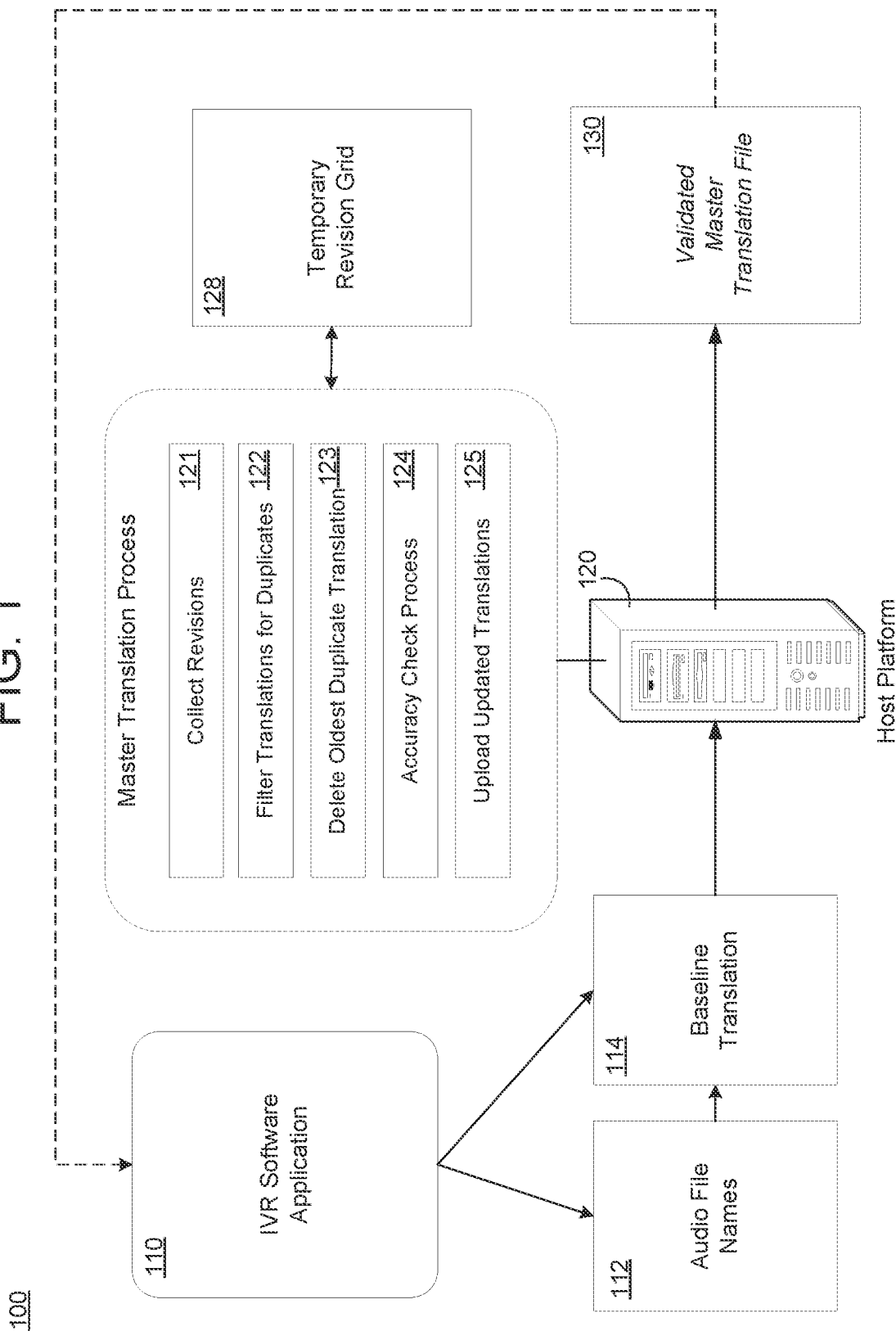
FIG. 1 is a diagram illustrating a system for updating a master translation of IVR prompts of a software application according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The example embodiments are directed towards a process of managing revisions of translations for IVR prompts using a grid structure (e.g., a table, spreadsheet, etc.) via a software program. A baseline translation may already be built for the IVR prompts. However, revisions may be made to the baseline translations over time. Rather than update the baseline translation at each revision interval, the example embodiments store revised translations of IVR prompts in a grid structure. When triggered, the software can The software can identify an IVR prompt that has multiple revisions and carry forward only the most recent (i.e., the newest) revision into the baseline translation document. Here, the grid structure allows multiple rounds of revisions to the IVR prompt translations to be stored. Furthermore, grid structure also provides storage of the baseline translations (from a previous interval). The software automates the filtering and the comparing process thereby relieving a user from having to manually perform such activities. Furthermore, the software can also extract and store the revised translations from different documents into the grid structure.

Furthermore, errors and omissions within the revised translations and the baseline translations may create incorrect content that can cause inconsistencies in the speech of the IVR application leading to caller frustration or confusion during playback/reading of the voice prompts. To address this, the example embodiments also provide a software that performs an automated accuracy validation of the IVR prompt translations. For example, the software can identify when an audio file from the IVR application is missing, identify when a translation has too many characters or not enough characters, identify when English duplicates are present but translated duplicates are not present (indicating the likelihood of a user error), and the like. By automatically performing an accuracy check, the software can ensure that errors do not occur in the IVR application when the revised translations are integrated into the application.

IVR systems are examples of computer-telephone integration (CTI). For example, a phone may communicate with a computer through the tones that are generated by each key on a telephone keypad. The tones are referred to as dual-tone multi-frequency (DTMF) signals. A computer may use hardware referred to as a telephony board or telephony card to understand DTMF signals produced by a phone. An IVR system may include a computer hooked up to a phone line through a telephony board/card and IVR software. The IVR software allows for pre-recorded greetings that are spoken during the call and menu options that a caller can select. In some cases, the IVR system may also provide video. Furthermore, the IVR system may implement dynamic concatenation which records phrases spoken by a user during the call and plays them back to the caller (e.g., dates, times, monetary amounts, account numbers, etc.)

An example use case of an IVR application is to route calls within an organization. Instead of relying on a receptionist to answer and route calls, the application can answer incoming calls and route the calls to a correct extensions within an organization. The application can present the user with a list of menu options and questions about the nature of the call. In some cases, the application may answer frequently asked questions. There are many different IVR applications, and the examples herein should not be construed as being limited to any particular type of IVR application.

During generation of the prompt content of an IVR application, a user may generate a spreadsheet, document, or other file which includes a list of IVR prompts for the IVR application. The user may upload the file to the system described herein. For example, the system may be a software tool running on a computing system such as a server, a user device, or the like. The system may receive the file, run different checks on the list of prompts, modify prompts, and output a modified file that is in a format that can be played by the application. Furthermore, the IVR prompts may also receive a translation into another language. The first request to translate the IVR prompts within the IVR application is referred to as a baseline translation. Over time, the baseline translation may go through multiple/frequent rounds of revisions.

With numerous translation revisions taking place, there is a need for a process that efficiently carries forward only the most current revised prompt translations into a master translation file. In the example embodiments, when a translation is revised, the most current translation is added to a temporary grid structure (e.g., a translation template) which is stored in memory. The temporary grid structure may have a two-dimensional format that includes columns representing different attributes of a revised IVR prompt (name, IVR prompt content, translation content, timestamp, etc.) and rows representing individual prompts by name. The software may compare and filter the revised translations in the temporary grid structure to remove any translations that have become outdated and carry forward only the most recent revised translation into the master translation file.

Prior to integrating the master translation file into the IVR application, the master translation file may be verified/validated for accuracy. Translations often happen at different times and by different users. As a result, some translations may be duplicated or may be missing. Also, some translations may be generated but may be missing an identifier of a corresponding audio file name in the IVR application. All of these issues can be checked, and warnings/alerts can be output by the software when a problem is found. As a result, a user can cure any issues prior to the master translations being added to the IVR application.

FIG. 1 illustrates a system 100 for updating a master translation of IVR prompts of a software application according to example embodiments. Referring to FIG. 1, the system 100 includes a host platform 120 which may host the master translation process described herein. For example, the master translation process may a service, an application, or the like, installed and executing on the host platform 120 which may be a user device, a server, a cloud platform, a database, and the like. According to various embodiments, the host platform 120 may manage a master translation file of IVR prompts which are included in an IVR application 110.

IVR data can be extracted from the IVR application 110 and stored in a template, as further described in the examples of FIGS. 2A-2F. For example, the IVR data may include audio file names 112 that represent the names of the different IVR prompts. In addition, the IVR data may include a baseline translation file 114 which includes translation data sets for IVR prompts within the IVR application 110. The baseline translation file 114 may include a tabular data structure or grid such as a spreadsheet, a table, a document, or the like. The grid may include different columns and rows. Different columns may be assigned to an IVR prompt name, an IVR prompt content, a translation of the IVR prompt into a different language, a timestamp, and the like. Meanwhile, the rows may represent the different IVR prompts.

The host platform 120 may store a copy of the audio file names 112 and the baseline translation file 114. In addition, the host platform 120 may store and manage a temporary revision grid 128 which is a temporary storage structure (e.g., a table, a document, a spreadsheet, an array, etc.) that stores revised translations to be added to the baseline translation file 114. The temporary revision grid 128 may include some (or all) of the same columns and rows as the baseline translation file 114. Revised translation data sets may be generated by one or more users (e.g., via a user device). The revised translations may be stored in the temporary revision grid 128 and then deleted once they have been stored in the master translation file 130 and/or the IVR application 110.

The master translation process may include a step 121 in which revised translation data sets are collected, for example, from various user accounts. The revised translation data sets may be stored in the temporary revision grid 128. The revised translation data sets may include a plurality of fields of data values including a prompt name, an IVR prompt content, a translation of the IVR prompt content, a timestamp, and the like. In step 122, the revised translation data sets may be filtered to identify revised translation data sets that have identical prompt names. When two or more translation data sets have the same prompt name, they are directed to the same IVR prompt in the IVR application 110. Here, duplicate prompt names can be identified, for example, by checking a box or adding a flag to the data set.

When two or more revised translation data sets have been identified as having the same prompt name, in 123, the host platform 120 may delete the oldest revised translation data set from among the two or more revised translation data sets. This allows the host platform to carry forward only the most recent revised translation data set while deleting any intervening translation data sets that are no longer the most up-to-date translations. In 124 an accuracy check can be performed to validate that the translations match the corresponding IVR prompt contents. The validated revised translation data set may be copied from the revision template 128 and stored in a master translation file 130. Furthermore, the master translation file 130 may be integrated into the IVR application 110, or otherwise stored in a repository in memory.

FIG. 2A illustrates a process 200A of deleting duplicate revised translation data sets of IVR prompts in accordance with example embodiments. Referring to FIG. 2A, in 201, a baseline translation of the IVR prompts included in an IVR application may be transferred into a grid structure, such as a temporary grid. The baseline translations may include initially generated translation data sets for IVR prompts within the IVR application. Each data set may include a prompt name, IVR prompt content, a translation of the IVR prompt content, a timestamp indicating when the translation was added, stored, etc., and the like. In 202, one or more revised translation data sets may be transferred into the grid structure. Here, the revised translation data sets may be revisions to some or all of the initial translation data sets stored in the baseline translations. The host platform may use the baseline translation data sets to identify duplicate translation data sets in the revision template 128.

According to various embodiments, multiple revisions may occur to the baseline translation data set. Each revision may modify different translation data sets. However, in some cases, the same translation data set may be modified multiple times. In this case, the host platform may carry forward only the most recent revised translation data set from among the multiple revised translation data sets, before any of the revised translation data sets are incorporated into the IVR application. Here, in 203, the host platform may identify duplicate revised translation data sets in the temporary revision grid. For example, the host platform may identify two or more revised translation data sets that have the same prompt name.

In 204, the host platform may identify which revised translation data set from among the two or more revised translation data sets that have the same prompt name has the oldest timestamp, and label the oldest revised translation data set for deletion. For example, a box may be checked, et. In 205, the host platform may transfer only the most recent translation data sets into a master translation file while the oldest/duplicate revised translation data sets are not transferred. In 206, the master translation file may be stored in memory, such as a document repository or the like.

FIG. 2B illustrates a temporary grid structure 200B which includes a plurality of revised translation data sets 220A, 220B, and 220C which have been collected and stored in a temporary grid structure. Each of the revised translation data sets include different revisions to a baseline translation data set of an IVR application. The grid structure includes a field 211 a name of an IVR prompt, field 212 for the English text of the IVR prompt content, field 213 for the translated test of the IVR prompt content into a different language, and field 214 for a timestamp at when the translation was added/stored in the system. In some embodiments, the translation data structures may also include an export number which identifies the order in which the revised translation data sets were exported into the temporary revision grid. Here, the baseline translation data set is not shown.

Referring to FIG. 2C, a process 200C is performed in which the host platform may identify duplicate revised translation data sets within the temporary grid structure, prior to the revised translation data sets being incorporated into the IVR application. For example, revised translation data sets 221A and 221C are duplicates because both share the same prompt name (AddServiceMenu_1). Likewise, revised translation data sets 222A and 222B are duplicates because both share the same prompt name (AddServiceMenu_2). Furthermore, revised translation data sets 223A, 223B, and 223C are each duplicates of the other two because all three share the same prompt name (AddServiceMenu_3). Here, the host platform may filter all of the collected revised translation data sets and compare prompt names to identify which revised translation data sets are duplicates.

As shown in FIG. 2D, a process 200D is performed in which the host platform may sort and order the revised translation data sets based on prompt names during a first sort operation and label some translation data sets for delete. In some embodiments, the host platform may perform a second sort just to ensure accuracy based on order numbers during a second sort operation. Furthermore, for the revised translation data sets that have duplicate prompt names, the host platform may identify the oldest and label the oldest with a delete flag, tag, or the like. In this example, the host platform adds an identifier to a delete column 216 to identify revised translation data sets 221A, 222A, 223A, and 223B which should be deleted before the revised translation data sets are incorporated in the IVR application.

The revised translation data sets stored in the temporary translation grid may be added to a master translation file 130 as shown in FIG. 2E. In this example, the revised translation data sets labeled with the delete identifier (e.g., data sets 221A, 222A, 223A, and 223B in FIG. 2D) may not be carried over into the master translation file 130. Instead, only the remaining (non-deleted) translation data sets may be transferred and pasted into the master translation file. In some embodiments, the transfer may extract the remaining revised translation data sets from the temporary translation grid and auto-populate the remaining revised translation data sets into the master translation file. Here, the columns may be aligned between the master translation file 130 and the temporary translation grid.

FIG. 2F illustrates a process 200F of integrating revised translation data sets into audio files within an IVR application 230. Here, a master translation process 242 (hosted by a host platform 240) may extract translation data sets from the master translation data file 130, identify which audio file names correspond to the revised translation data sets, and store the content of IVR prompt, the translation, and the timestamp in the IVR application 230. Here, the master translation process 242 may map revised translation data sets to audio file names based on prompt names within the revised translation data sets. For example, a revised translation data set having a prompt name that is identical to an audio file name may be mapped together and IVR data from the revised translation data set may be transferred and stored into the corresponding slot of the IVR application 230.

Figure 3A:
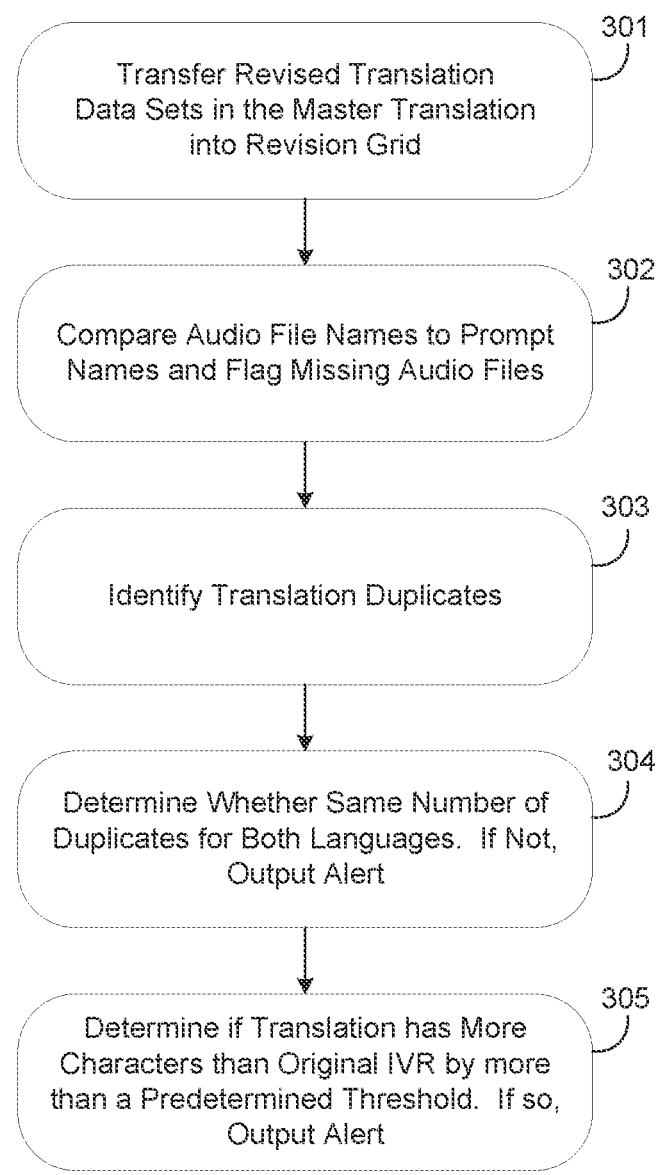

FIG. 3A illustrates a process 300A of performing an accuracy verification on revised translation data sets prior to the revised translation data sets being integrated into an IVR application, according to example embodiments. Referring to FIG. 3A, in 301, the host platform may transfer revised translation data sets from a master translation file into a revision grid. The revision grid may be a temporary data structure which includes columns representing prompt name, IVR prompt content, a translation of the IVR prompt content, a timestamp, and the like. In 302, the host platform may compare the prompt names of the revised translation data sets that are stored in the revision grid to audio file names that are downloaded from the IVR application. If an IVR prompt name is not included in the audio file names, the host platform can detect that an audio file name is missing, for example, as a result of human error, or the like. If any audio file names are missing, an alert may be generated which identifies the missing audio file name via a user interface.

In 303, the host platform may identify revised translation data sets that have duplicated IVR prompt content. Here, the host platform may first identify revised translation data sets that have identical original IVR prompt content in a first language (e.g., English). Next, the host platform may identify revised translation data sets that have identical translated prompt content (e.g., Spanish, French, Russian, etc.) In 304, the host platform may identify whether the translation data sets with matching IVR prompt content also include matching translated prompt content. If the IVR prompt content is the same between two translation data sets but the translated IVR prompt content is different, this indicates a potential user error or some other mistake may have occurred. Here, the host platform may generate an alert, for example, by adding a flag or an alert to a visualization of the revision grid.

Next, in 305, the host platform may perform a word count of each IVR prompt content and its corresponding translated prompt content, for each of the revised translation data sets. For any revised translation data sets where the number count differs by a predetermined amount, the host platform may generate another flag or alert to the revision grid. This identifies that a user should manually review these translation data sets for accuracy.

Figure 3B:
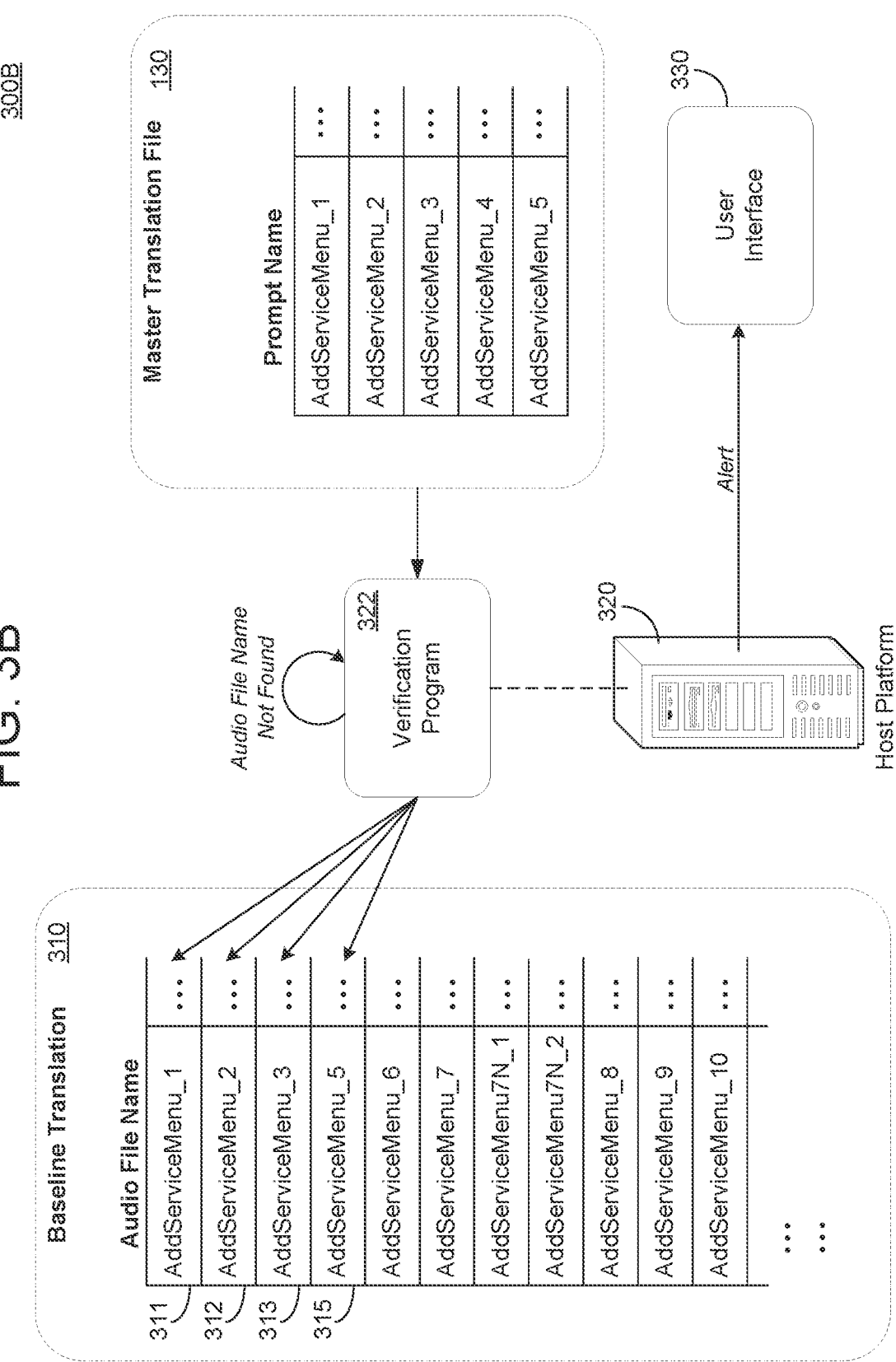

FIG. 3B illustrates a verification process 300B that may be performed when the master translation file 130 is to be incorporated into an IVR application. Here, a verification program 322 host by a host platform 320 may verify that the revised translation data sets in the master translation file 130 have corresponding audio file names in the baseline translation 310. If an audio file name is missing from the baseline translation 310, the audio file name may be identified and labeled via a user interface to enable a user to manually adjust the baseline translation 310 to include the audio file name. In this example, the verification program 322 identifies that audio file names 311, 312, 313, and 315 have matching prompt names in the master translation file 130. However, the verification program 322 also identifies that a prompt name 316 in the master translation file 130 is missing (not found) a corresponding audio file name in the baseline translation file 310. Thus, an alert can be output to a user interface 330 which may include the revision grid.

FIG. 3C illustrates an example of a revision grid 300C which includes a plurality of revised translation data sets to be added to an IVR application according to example embodiments. In this example, the host platform performs a duplication check to identify which translation data sets include duplicate prompt content and which translation data sets include duplicate translated prompt content. When a revised translation data set has a duplicate English versions of the IVR prompt content it should also have a duplicate translated version. However, in many cases, the two are not duplicates because they are created by different users at different times (and refer to different prompt names).

In this case, the host platform may detect when a revised translation data set 342 has a duplicate English prompt content but a different translated prompt content as another revised translation data set 341. Here, the host platform may output an alert inside of a column 352 in the revision grid 300C to indicate that a user should manually view the translation content to ensure it is correct.

In addition, the host platform may perform a word count of the IVR prompt content and the translated prompt content for each revised translation data set. When the word count between the English version of the prompt content and the translated version of the prompt content differs by a predetermined number of characters (e.g., 40% bigger or smaller) the host platform may output an alert such as shown in revised translation data set 345 indicating that a user should manually check the prompt content and the translated prompt content to ensure it is accurate. In revised translation data set 345, the translated prompt content is much bigger than the original IVR prompt content (in English). Once the user has reviewed the alerts shown in FIG. 3C, the revision grid may be integrated into the baseline translation file of the IVR application, for example, via button on the user interface, etc.

FIG. 4A illustrates a method 410 of reducing revised translations of IVR prompts according to example embodiments. For example, the method 410 may be performed by a computing device such as a desktop computer, a server, a database, a cloud platform, and the like. Referring to FIG. 4A, in 411, the method may include transferring a copy of a plurality of revised translation data sets to be added to the software application into a grid structure, each revised translation data set comprising a prompt name in a first field, an interactive voice response (IVR) prompt in a second field, a translation of the IVR prompt into a different language in a third field, and a timestamp in a fourth field. Other fields may be included such as export number fields (e.g., the identification of the IVR prompt in the IVR application, etc.), duplicate identifier fields, delete identification fields, and the like. The grid structure may be a two-dimensional grid structure such as a table, a spreadsheet, an array, or the like.

In 412, the method may include identifying two revised translation data sets in the grid structure that comprise a duplicate prompt name in first fields thereof. Here, the IVR prompt name may be identical in each of the two revised translation data sets, while the IVR prompt content and/or the IVR translation may be the same or may be different. In either case, an extra data set is identified. In some embodiments, more than two duplicates are identified (e.g., three or more, etc.)

In 413, the method may include deleting an oldest revised translation data set among the two identified translations data sets from the grid structure. Here, the system may compare the timestamps of the two revised translation data sets to identify which data set is older than the other. The oldest data set can be deleted even though it is yet to be added to the IVR application because it is outdated and has been replaced by the more current revised translation. The deletion process may include deleting the row corresponding to the oldest translation data set from the grid structure and moving the rows underneath the deleted row up by one. In 414, the method may further include storing the grid structure without the deleted oldest revised translation data set in a repository.

In some embodiments, the grid structure comprises a two-dimensional spreadsheet which includes a plurality of rows assigned to the plurality of revised translation data sets, respectively, and a plurality of columns assigned to the first, second, third, and fourth fields. In some embodiments, the grid structure further comprises an extra column with identifiers of the plurality of translation data sets and an extra row with names of the first, second, third, and fourth fields.

In some embodiments, the transferring may include copying the plurality of translation data sets from a plurality of revision documents, and auto-populating the plurality of copied translation data sets into the grid structure. In some embodiments, the identifying may further include adding a duplicate flag to a fifth field of the oldest translation data set indicating that the oldest translation data set is to be deleted.

In some embodiments, the method may further include transferring a copy of a baseline translation data set currently present within a software application into the grid structure, where each baseline translation data set comprises a prompt name in a first field, an IVR prompt in a second field, a translation of the IVR prompt into a different language in a third field, and a timestamp in a fourth field. In some embodiments, the method may further include matching revised translation data sets in the grid structure with corresponding baseline translation data sets in the grid structure, replacing the matched baseline translation data sets with the updated revised translation data sets in the grid structure to generate an updated translation data set, and storing the updated translation data set in a master translation grid. In some embodiments, the method may further include integrating the updated translation data set stored in the master translation grid into the software application.

FIG. 4B illustrates a method 420 of validating an accuracy of IVR prompt translations according to example embodiments. For example, the method 410 may be performed by a computing device such as a desktop computer, a server, a database, a cloud platform, and the like. In some cases, the method 420 may be performed in sequence with the method 410 described in FIG. 4A. As another example, the methods 410 and 420 may be performed simultaneously with parts/steps of each interleaved with the other. In some embodiments, both methods may be performed by the same system/software or they may be performed by different systems/software. Referring to FIG. 4B, in 421, the method may include transferring a copy of a plurality of revised translation data sets to be added to an interactive voice response (IVR) application into a grid structure, each revised translation data set comprising a prompt name in a first field, an IVR prompt in a second field, a translation of the IVR prompt into a different language in a third field, and a timestamp in a fourth field. Here, the grid structure may be a temporary storage structure such as a table, a spreadsheet, a document, an array, or the like.

In 422, the method may include executing, via a processor, an accuracy validation on the plurality of revised translation data sets, wherein, for each revised translation data set, the processor identifies whether a respective translation in a different language in a third field is an accurate translation of a respective IVR prompt in a second field based on attributes of the respective translation and the respective IVR prompt, and in 423, the method may include displaying results of the accuracy validation via a user interface.

In some embodiments, the grid structure may include a two-dimensional spreadsheet which includes a plurality of rows assigned to the plurality of revised translation data sets, respectively, and a plurality of columns assigned to the first, second, third, and fourth fields, respectively. In some embodiments, the executing may include performing a character count of a respective IVR prompt in a second field and a respective translation of the IVR prompt in a third field of a revised translation data set, and determining whether the respective translation is an accurate translation based on the character counts. In this example, the executing may include identifying that the respective translation of the IVR prompt is an inaccurate translation in response to the character count of the respective translation being greater than the character count of the IVR prompt by a predetermined threshold, and displaying an alert in association with the revised translation data set via the user interface.

In some embodiments, the executing may include identifying two revised translation data sets that comprise identical IVR prompts in second fields thereof, and different translations in third fields thereof, respectively, and displaying an alert in association with at least one of the two revised translation data sets via the user interface. In some embodiments, the method may further include extracting a plurality of audio file names from the IVR application and transferring the plurality of audio file names from the IVR application into the grid structure. In this example, the method may further include matching the plurality of audio file names from the IVR application to corresponding translation data sets from the plurality of translation data sets based on prompt names of the corresponding translation data sets. In addition, the method may further include identifying a revised translation data set that is not matched to any of the plurality of audio file names, determining that an audio file name of the identified revised translation is not found, and displaying an alert identifying that an audio file is not found via the user interface.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
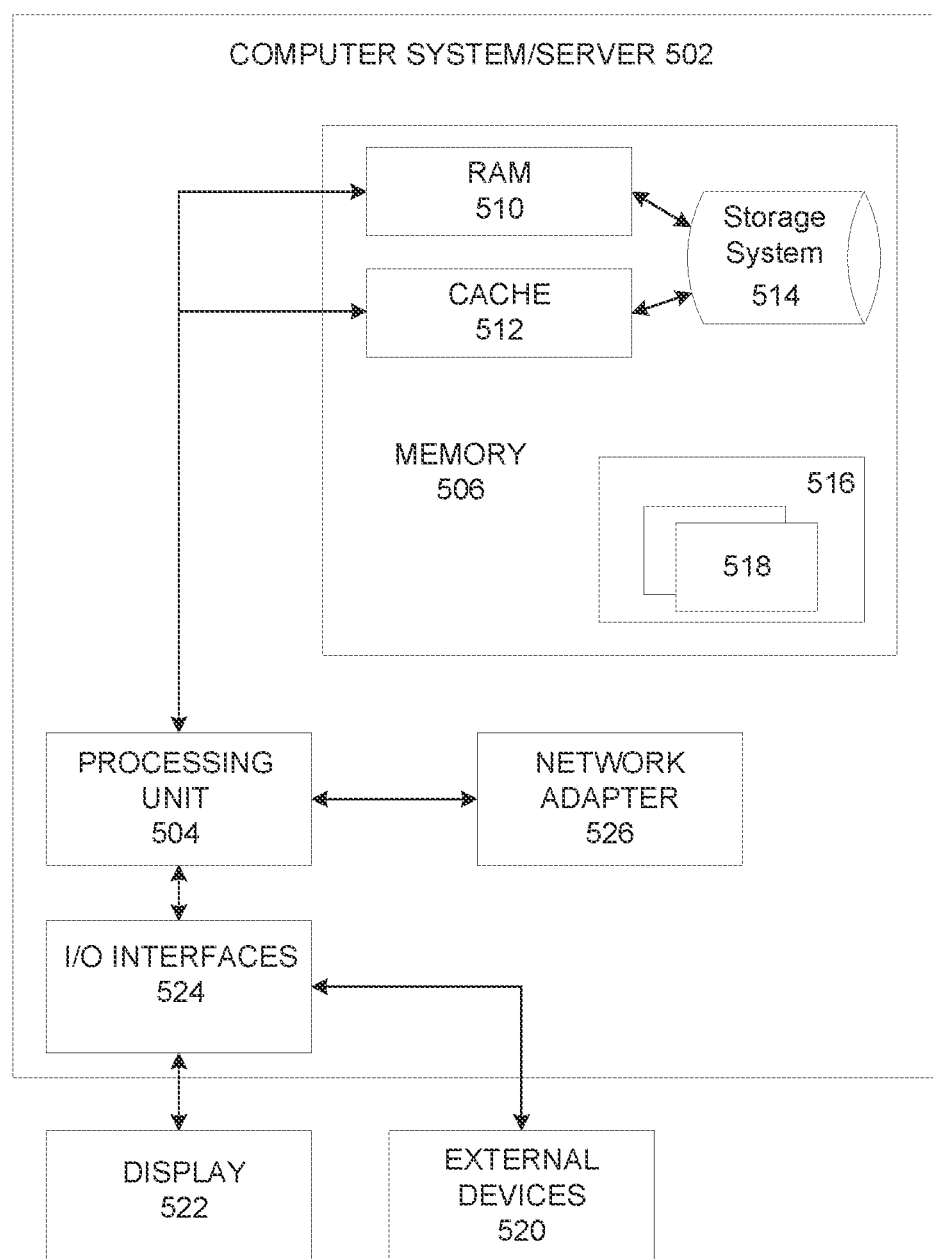
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove. For example, the computing node 500 may be a network server of a larger enterprise network that connects multiple user workstations to the Internet, a private network, or the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502;

and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
a processor that when executing instructions stored in an associated memory is configured to:
transfer a copy of one or more current baseline translation data sets from a software application into a temporary grid structure;
transfer a copy of a plurality of revised translation data sets to be added to the software application into the temporary grid structure, where each revised translation data set, of the plurality revised translation data sets, comprises a prompt name in a first field, an interactive voice response (IVR) prompt in a second field, a translation of the IVR prompt into a different language in a third field, and a timestamp in a fourth field, wherein the plurality of revised translation data sets are revisions of the one or more baseline translation data sets;
identify that two revised translation data sets in the grid structure comprise duplicate prompt names in their corresponding first fields;
delete an oldest revised translation data set of the two identified translations data sets from the grid structure based on an oldest timestamp to generate a current temporary grid structure storing a most recent revised translation data set;
store the most recent revised translation data set in a master translation file; and
integrate the most recent revised translation data set in master translation file into the software application.

2. The apparatus of claim 1, wherein the grid structure comprises:
a spreadsheet including a plurality of rows assigned to corresponding revised translation data sets, of the plurality of revised translation data sets and a plurality of columns corresponding to the first, second, third, and fourth fields.

3. The apparatus of claim 2, wherein the grid structure further comprises:
an extra column with identifiers of the plurality of revised translation data sets and an extra row with names of the first, second, third, and fourth fields.

4. The apparatus of claim 1, wherein the processor is configured to:
copy the plurality of revised translation data sets from a plurality of revision documents, and
auto-populate the plurality of revised translation data sets into the grid structure.

5. The apparatus of claim 1, wherein the processor is further configured to:
add a duplicate flag that indicates that the oldest translation data set is to be deleted to a fifth field of the oldest revised translation data set.

6. The apparatus of claim 1, wherein the one or more current baseline translation data sets each comprise:
a prompt name in a first field, an IVR prompt in a second field, a translation of the IVR prompt into a different language in a third field, and a timestamp in a fourth field.

7. The apparatus of claim 6, wherein the processor is further configured to:
match the one or more baseline translation data sets in the grid structure with corresponding revised translation data sets, of the plurality revised translation data sets, in the grid structure;
replace the matched one or more baseline translation data sets with the corresponding revised translation data sets in the grid structure to generate one or more updated baseline translation data sets; and
store the one or more updated baseline translation data sets in a master translation grid.

8. A method comprising:
transferring, by a host system, a copy of one or more current baseline translation data sets from a software application into a temporary grid structure;
transferring, by the host system, a copy of a plurality of revised translation data sets to be added to the software application into the temporary grid structure, where each revised translation data set, of the plurality revised translation data sets, comprises a prompt name in a first field, an interactive voice response (IVR) prompt in a second field, a translation of the IVR prompt into a different language in a third field, and a timestamp in a fourth field, wherein the plurality of revised translation data sets are revisions of the one or more baseline translation data sets;
identifying, by the host system, that two revised translation data sets in the grid structure comprise duplicate prompt names in their corresponding first fields;
deleting, by the host system, an oldest revised translation data set of the two identified translations data sets from the grid structure based on an oldest timestamp to generate a current temporary grid structure storing a most recent revised translation data set; and
storing, by the host system, the most recent revised translation data set in a master translation file; and
integrating, by the host system, the most recent revised translation data set in master translation file into the software application.

9. The method of claim 8, wherein the grid structure comprises:
a spreadsheet including a plurality of rows assigned to corresponding revised translation data sets, of the plurality of revised translation data sets and a plurality of columns corresponding to the first, second, third, and fourth fields.

10. The method of claim 9, wherein the grid structure further comprises:
an extra column with identifiers of the plurality of revised translation data sets and an extra row with names of the first, second, third, and fourth fields.

11. The method of claim 8, wherein the grid structure further comprises:
an extra column with identifiers of the plurality of revised translation data sets and an extra row with names of the first, second, third, and fourth fields.

12. The method of claim 8, wherein the method further comprises:
adding a duplicate flag that indicates that the oldest translation data set is to be deleted to a fifth field of the oldest revised translation data set.

13. The method of claim 8, wherein the one or more current baseline translation data sets each comprise:
a prompt name in a first field, an IVR prompt in a second field, a translation of the IVR prompt into a different language in a third field, and a timestamp in a fourth field.

14. The method of claim 13, further comprising,
matching the one or more baseline translation data sets in the grid structure with corresponding revised translation data sets, of the plurality revised translation data sets, in the grid structure;
replacing the matched one or more baseline translation data sets with the corresponding revised translation data sets in the grid structure to generate one or more updated baseline translation data set; and
storing the one or more updated baseline translation data sets in a master translation grid.

15. A non-transitory computer-readable medium comprising instructions that when executed by a processor cause the processor to perform:
transferring a copy of one or more current baseline translation data sets from a software application into a temporary grid structure;
transferring a copy of a plurality of revised translation data sets to be added to the software application into the temporary grid structure, where each revised translation data set, of the plurality revised translation data sets, comprises a prompt name in a first field, an interactive voice response (IVR) prompt in a second field, a translation of the IVR prompt into a different language in a third field, and a timestamp in a fourth field, wherein the plurality of revised translation data sets are revisions of the one or more baseline translation data sets;

identifying that two revised translation data sets in the grid structure comprise duplicate prompt names in their corresponding first fields;

deleting an oldest revised translation data set of the two identified translations data sets from the grid structure based on an oldest timestamp to generate a current temporary grid structure storing a most recent revised translation data set; and storing the most recent revised translation data set in a master translation file; and integrate the most recent revised translation data set in master translation file into the software application.

16. The non-transitory computer-readable medium of claim 15, wherein the transferring the copy of the plurality of revised translation data sets into the temporary grid structure further comprises:

copying the plurality of revised translation data sets from a plurality of revision documents; and auto-populating the plurality of copied translation data sets into the grid structure.

17. The non-transitory computer-readable medium of claim 15, wherein the one or more current baseline translation data sets each comprise:

a prompt name in a first field, an IVR prompt in a second field, a translation of the IVR prompt into a different language in a third field, and a timestamp in a fourth field.

18. The non-transitory computer-readable medium of claim 17, wherein the instructions further cause the processor to perform:

matching the one or more baseline translation data sets in the grid structure with corresponding revised translation data sets, of the plurality revised translation data sets, in the grid structure;

replacing the matched one or more baseline translation data sets with the corresponding revised translation data sets in the grid structure to generate one or more updated baseline translation data sets; and storing the one or more updated baseline translation data sets in a master translation grid.

* * * * *